(12) United States Patent
Morotomi et al.

(10) Patent No.: US 10,882,516 B2
(45) Date of Patent: Jan. 5, 2021

(54) COLLISION AVOIDANCE ASSISTING APPARATUS

(71) Applicant: TOYOTA JIDOSHA KABUSHIKI KAISHA, Toyota (JP)

(72) Inventors: Kohei Morotomi, Shizuoka-ken (JP); Noriyuki Tsuruoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 15/911,841

(22) Filed: Mar. 5, 2018

(65) Prior Publication Data
US 2018/0257644 A1 Sep. 13, 2018

(30) Foreign Application Priority Data
Mar. 7, 2017 (JP) ................................ 2017-042725

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/184* (2013.01);
(Continued)

(58) Field of Classification Search
CPC ............... B60W 10/184; B60W 10/20; B60W 2420/42; B60W 2420/52; B60W 2550/10;
(Continued)

(56) References Cited

U.S. PATENT DOCUMENTS

| | | | |
|---|---|---|---|
| 2017/0021829 A1 | 1/2017 | Nishimura | |
| 2017/0057498 A1 | 3/2017 | Katoh | |
| 2017/0349169 A1* | 12/2017 | Deshpande | ........... B60W 10/18 |

FOREIGN PATENT DOCUMENTS

| | | | | |
|---|---|---|---|---|
| JP | 2007-145315 A | | 6/2007 | |
| JP | 2015049823 A | * | 3/2015 | ............ B60W 30/09 |

(Continued)

*Primary Examiner* — Charles J Han
(74) *Attorney, Agent, or Firm* — Hunton Andrews Kurth LLP

(57) ABSTRACT

Disclosed is a collision avoidance assisting apparatus which can execute an automatic braking process and an automatic steering process for avoiding collision with an obstacle. When the magnitude of a steering angle exceeds a predetermined threshold, the collision avoidance assisting apparatus determines that a driver has an intention of avoiding the collision by a steering operation and stops the automatic braking process and the automatic steering process. However, in such a case, the automatic braking process and the automatic steering process may be stopped when the steering angle exceeds the threshold as a result of execution of the automatic steering process. In view of this, when both the automatic braking process and the automatic steering process are being executed, the collision avoidance assisting apparatus continues the automatic braking process and the automatic steering process even when the magnitude of the steering angle is greater than the predetermined threshold.

12 Claims, 6 Drawing Sheets

(51) Int. Cl.
  *B60W 10/184*  (2012.01)
  *G05D 1/02*  (2020.01)
  *G01S 13/931*  (2020.01)
  *B60W 10/20*  (2006.01)
  *G01S 13/86*  (2006.01)

(52) U.S. Cl.
  CPC ........... *B60W 10/20* (2013.01); *G01S 13/867* (2013.01); *G01S 13/931* (2013.01); *G05D 1/0214* (2013.01); *G05D 1/0246* (2013.01); *G05D 1/0257* (2013.01); *B60W 2420/42* (2013.01); *B60W 2420/52* (2013.01); *B60W 2510/20* (2013.01); *B60W 2554/00* (2020.02); *B60W 2710/18* (2013.01); *B60W 2710/20* (2013.01); *G01S 2013/9318* (2020.01); *G01S 2013/93185* (2020.01); *G01S 2013/93271* (2020.01)

(58) Field of Classification Search
  CPC ......... B60W 2710/00; B60W 2710/18; B60W 2710/20; B60W 30/08; B60W 30/09; G01S 13/867; G01S 13/93; G01S 13/931; G01S 2013/9342; G01S 2013/9346; G05D 1/0214; G05D 1/0246; G05D 1/0257
  See application file for complete search history.

(56) References Cited

FOREIGN PATENT DOCUMENTS

JP  2017-027292 A  2/2017
JP  2017-043262 A  3/2017

* cited by examiner

COLLISION AVOIDANCE ASSISTING APPARATUS

CROSS-REFERENCE TO RELATED APPLICATION

The present application claims priority to Japanese Patent Application No. 2017-042725 filed on Mar. 7, 2017, which is incorporated herein by reference in its entirety.

BACKGROUND OF THE INVENTION

Field of the Invention

The present invention relates to a collision avoidance assisting apparatus which controls a braking apparatus and a steering apparatus of a vehicle so as to avoid collision of the vehicle with an obstacle.

Description of the Related Art

A conventionally known collision avoidance assisting apparatus of such a type (hereinafter also referred to as the "conventional apparatus") starts an automatic braking process of generating a braking force for avoiding collision of a vehicle with an obstacle if a predicted time until the collision with the obstacle is less than a predetermined value. In addition, when the collision with the obstacle cannot be avoided by the automatic braking process only, the conventional apparatus executes an "automatic steering process of automatically changing the steering angle of the vehicle" in addition to the automatic braking process (see Japanese Patent Application Laid-Open (kokai) No. 2017-27292).

Incidentally, the driver of the vehicle may perform a steering operation for collision avoidance during execution of the automatic braking process. In such a case, it may be appropriate not to execute the automatic braking process, in order to place priority on the collision avoidance operation by the driver. In view of this, the execution of the automatic braking process may be stopped when the magnitude of a steering angle, which corresponds to the operation amount of the steering wheel of the vehicle, is greater than a predetermined angle threshold.

However, in the case where the automatic steering process is being executed in addition to the automatic braking process, there arises a possibility that, even when the magnitude of the steering angle exceeds the angle threshold, it cannot be determined whether that has occurred as a result of the steering operation by the driver or as a result of the automatic steering process.

SUMMARY OF THE INVENTION

The present invention has been accomplished so as to solve the above-described problem. Namely, one object of the present invention is to provide a collision avoidance assisting apparatus which can properly determine whether to stop the execution of the automatic braking process when the magnitude of the steering angle increases during the execution of the automatic braking process.

A collision avoidance assisting apparatus according to the present invention which achieves the above-described object (hereinafter also referred to as the "apparatus of the present invention") includes an obstacle detection section, a steering angle sensor, and a collision avoidance control section.

Said obstacle detection section (a millimeter wave radar 41 and a front camera 42) detects an obstacle in a heading direction of a vehicle (10).

Said steering angle sensor (68) detects, as a steering angle ($\theta$s), the rotational angle of a steering wheel (51) of said vehicle.

Said collision avoidance control section (a collision avoidance ECU 20) executes an "automatic braking process" of decreasing the speed of said vehicle (vehicle speed Vs) by controlling a braking apparatus (a brake ECU 32 and a brake actuator 66) of said vehicle when said vehicle is determined to collide with said detected obstacle (a "Yes" determination in step 425 of FIG. 4) (FIG. 5).

In addition, said collision avoidance control section executes an "automatic steering process" in addition to said automatic braking process when it is determined that said vehicle cannot be stopped by said automatic braking process at a point in time before said vehicle reaches said obstacle (a "Yes" determination in step 525 of FIG. 5), said automatic steering process changing the turning angles of turnable wheels of said vehicle by controlling a steering apparatus of said vehicle including said steering wheel (FIG. 6).

Further, in the case where said collision avoidance control section is executing said automatic braking process and is not executing said automatic steering process, said collision avoidance control section stops the execution of said automatic braking process (step 555 to step 560 of FIG. 5) when the magnitude of said detected steering angle becomes greater than a predetermined "first angle threshold ($\theta$th1)" (a "No" determination in step 510 of FIG. 5); and in the case where said collision avoidance control section is executing both said automatic braking process and said automatic steering process, said collision avoidance control section continues both said automatic braking process and said automatic steering process even when the magnitude of said detected steering angle becomes greater than said first angle threshold.

When the magnitude of the steering angle is greater than the first angle threshold, the apparatus of the present invention determines whether to stop the execution of the automatic braking process on the basis of whether or not the automatic steering process is executed. Therefore, it is possible to avoid the occurrence of a phenomenon that the automatic braking process is stopped when the magnitude of the steering angle increases as a result of execution of the automatic steering process. Accordingly, the apparatus of the present invention can properly determine whether to stop the execution of the automatic braking process when the magnitude of the steering angle increases during the execution of the automatic braking process.

In one mode of the apparatus of the present invention, in the case where said collision avoidance control section is executing both said automatic braking process and said automatic steering process, said collision avoidance control section stops the execution of said automatic braking process and the execution of said automatic steering process (steps 630 to 645 of FIG. 6) when the magnitude of said detected steering angle becomes greater than a predetermined "second angle threshold ($\theta$th2)" greater than said first angle threshold (a "No" determination in step 610 of FIG. 6).

When the magnitude of the steering angle is greater than the second angle threshold, it is clear that the driver is trying to avoid collision with the obstacle by his/her steering operation. Accordingly, the apparatus of the present mode can stop the automatic braking process and the automatic steering process when the driver is trying to avoid collision with the obstacle by his/her steering operation.

Further, in the present mode, preferably, said collision avoidance control section is configured to control said steering apparatus such that the magnitude of said steering angle does not become greater than a predetermined maximum steering angle (θmax) when said collision avoidance control section executes said automatic steering process; and said collision avoidance control section employs a value smaller than said maximum steering angle as said first angle threshold and employs a value greater than said maximum steering angle as said second angle threshold.

In this case, when the magnitude of the steering angle is greater than the second angle threshold, it is clearer that the driver is trying to avoid collision with the obstacle by his/her steering operation, and thus, the execution of the automatic braking process and the execution of the automatic steering process are stopped. Meanwhile, in the case where the automatic steering process is not executed and the automatic braking process is being executed, the automatic braking process is stopped when the magnitude of the steering angle becomes greater than the first angle threshold (namely, before the magnitude of the steering angle becomes greater than the second angle threshold). Accordingly, the apparatus of the present mode can more properly determine whether to stop the automatic braking process and the automatic steering process in the case where the driver is trying to avoid collision with the obstacle by his/her steering operation.

In another mode of the apparatus of the present invention, said collision avoidance control section is configured to estimate, as a "collision time (TTC)," a time elapsing until said vehicle collides with said obstacle and to determine that said vehicle collides with said obstacle when said estimated collision time is shorter than a predetermined time threshold (Tth) (a "No" determination in step 425 of FIG. 4).

The magnitude of the collision time can be obtained by, for example, dividing the "distance between the vehicle and the obstacle (obstacle distance)" by the "amount of change in the obstacle distance per unit time (relative speed)." Therefore, the apparatus of the present mode can determine whether or not the vehicle is to collide with the obstacle by performing a simple process.

Further, in the present mode, preferably, said collision avoidance control section is configured such that when said estimated collision time is shorter than said time threshold, said collision avoidance control section determines a "required deceleration (Dcreq)" necessary for avoiding collision with said obstacle;

when the magnitude of said required deceleration is equal to or less than the magnitude of a "maximum deceleration (Dcmax)," said collision avoidance control section uses said required deceleration as a "target deceleration (Dctgt)" (step 565 of FIG. 5), and when the magnitude of said required deceleration is greater than the magnitude of said maximum deceleration, said collision avoidance control section uses said "maximum deceleration" as said "target deceleration" (step 530 of FIG. 5);

said collision avoidance control section executes said automatic braking process such that the actual deceleration of said vehicle becomes equal to said target deceleration (steps 545 to 550 of FIG. 5); and when the magnitude of said required deceleration is greater than the magnitude of said maximum deceleration, said collision avoidance control section determines that said vehicle cannot be stopped by said automatic braking process at a point in time before said vehicle reaches said obstacle (a "Yes" determination in step 525 of FIG. 5).

The braking apparatus of the vehicle realizes braking by, for example, preventing rotations of the wheels by frictional forces (braking frictional forces). The greater the braking frictional forces, the greater the deceleration (negative acceleration) of the vehicle. However, when the braking frictional forces become excessively large, slippage occurs between the wheels and a road surface. Therefore, a deceleration slightly smaller than a deceleration at which the slippage between the wheels and the road surface starts is determined as the maximum deceleration. The maximum deceleration may be determined in advance. Alternatively, in the case where the braking apparatus includes an antilock brake mechanism, a deceleration corresponding to the maximum frictional braking force which causes no slippage between the wheels and the road surface during braking may be used as the maximum deceleration. The apparatus of the present mode can shorten, to a possible degree, the time required to stop the vehicle by the automatic braking process, and can properly determine whether or not collision with the obstacle can be avoided by the automatic braking process only.

In another mode of the apparatus of the present invention, said collision avoidance control section is configured such that, when said collision avoidance control section executes said automatic steering process, said collision avoidance control section controls said steering apparatus so as to cause said vehicle to travel along a detouring travel path which is a travel path of said vehicle for avoiding collision with said obstacle.

The detouring travel path is a path for avoiding collision with an obstacle which is highly likely to collide with the vehicle and may be a path for avoiding collision with other obstacles. The apparatus of this mode can reliably avoid collision with obstacles through execution of the automatic steering process.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENTS

Figure 1:
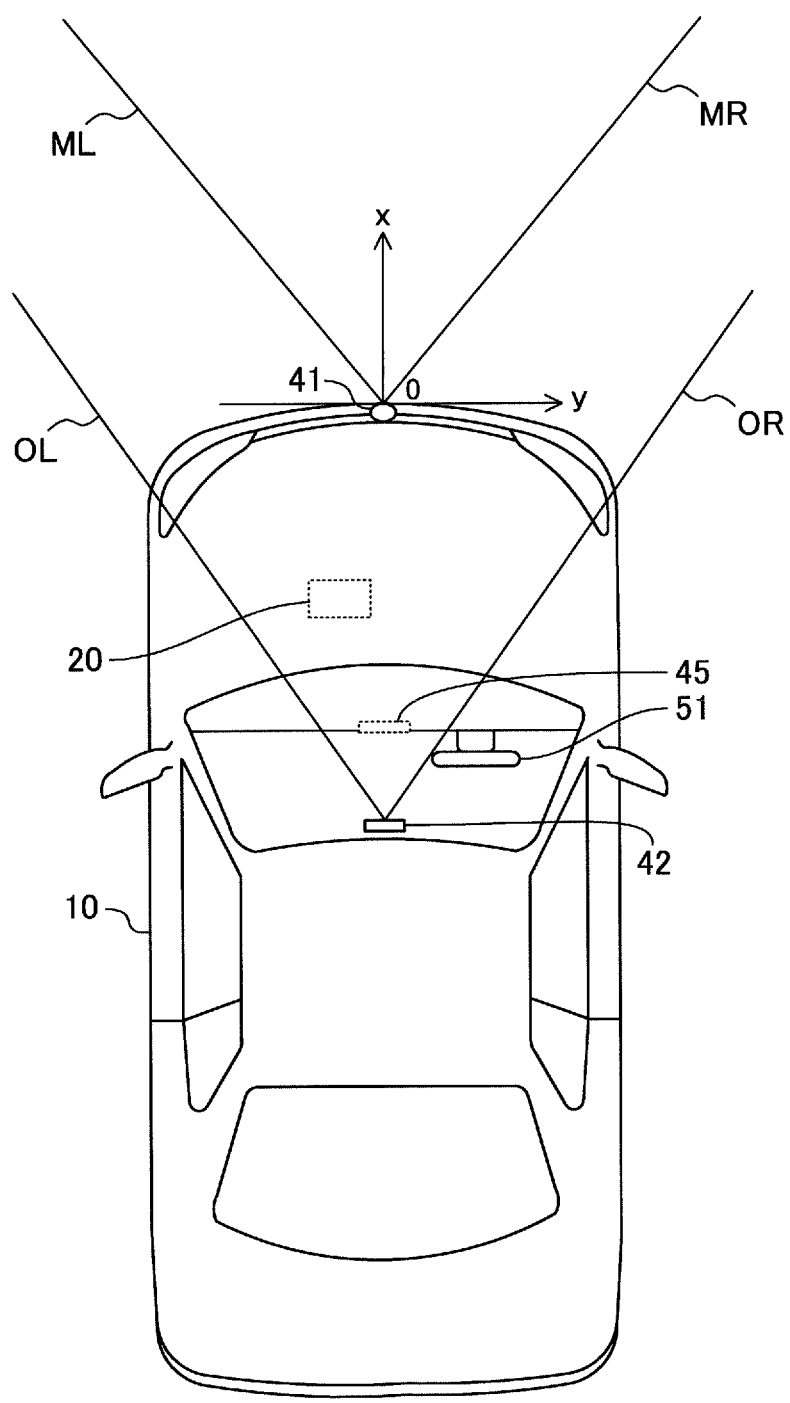
FIG. 1 is a schematic diagram of a vehicle (present vehicle) on which a collision avoidance assisting apparatus (present assisting apparatus) according to an embodiment of the present invention is mounted.

A collision avoidance assisting apparatus according to an embodiment of the present invention (hereinafter also referred to as the "present assisting apparatus") will now be described with reference to the drawings. The present assisting apparatus is applied to a vehicle 10 shown in FIG. 1. FIG. 2 shows a block diagram of the present assisting apparatus. The present assisting apparatus includes "a collision avoidance ECU 20, an engine ECU 31, a brake ECU 32, and an EPS ECU 33" each of which is an electronic control unit (ECU).

The collision avoidance ECU 20 includes a CPU, a ROM, and a RAM. The CPU performs data reading, numerical computation, computation result output, etc. by repeatedly executing predetermined programs (routines). The ROM stores the programs executed by the CPU, lookup tables (maps), etc. The RAM stores data temporarily.

Like the collision avoidance ECU 20, each of the engine ECU 31, the brake ECU 32, and the EPS ECU 33 includes a CPU, a ROM, and a RAM. These ECUs can perform data communication (can exchange data) with one another through a CAN (controller area network) 34. In addition, through the CAN 34, each ECU can receive from "other ECUs" output values of sensors connected to the other ECUs.

The collision avoidance ECU 20 is connected to a millimeter wave radar 41, a front camera 42, a vehicle speed sensor 43, a yaw rate sensor 44, an acceleration sensor 45, an input output device 46, and speakers 47.

The millimeter wave radar 41 transmits a millimeter wave (electromagnetic wave whose frequency falls within the range of 30 GHz to 300 GHz) toward a region ahead of the vehicle 10, and receives its reflected wave. On the basis of the transmitted wave and the reflected wave, the millimeter wave radar 41 obtains, as target information, the position (relative position) of a target present ahead of the vehicle 10 in relation to the vehicle 10, the speed (relative speed) of the target in relation to the vehicle 10, the angle of the left end of the target in relation to the vehicle 10, and the angle of the right end of the target in relation to the vehicle 10. The millimeter wave radar 41 outputs the obtained target information to the collision avoidance ECU 20. The searching range of the millimeter wave radar 41 in the horizontal direction is equal to a range represented by an angle (acute angle) formed between a straight line ML and a straight line MR shown in FIG. 1.

The front camera 42 is disposed at a position near a room mirror (not shown) provided at an upper position within the compartment of the vehicle 10. The front camera 42 captures an image of a region in front of the vehicle 10 (hereinafter also referred to as the "frontward image") and outputs a signal representing the frontward image to the collision avoidance ECU 20. The angle of view (field of view) of the front camera 42 in the horizontal direction is equal to a range represented by an angle (acute angle) formed between a straight line OL and a straight line OR shown in FIG. 1.

The vehicle speed sensor 43 detects the vehicle speed Vs of the vehicle 10 and outputs a signal representing the vehicle speed Vs to the collision avoidance ECU 20.

The yaw rate sensor 44 detects the yaw rate YR of the vehicle 10 and outputs a signal representing the yaw rate YR to the collision avoidance ECU 20.

The acceleration sensor 45 detects the acceleration As of the vehicle 10 in the longitudinal direction (the amount of change in the vehicle speed Vs per unit time).

The input output device 46 is disposed on the dashboard of the vehicle 10. The input output device 46 includes a display unit (liquid crystal display). Characters, figures, etc. displayed on the display unit of the input output device 46 are controlled by the collision avoidance ECU 20. The display unit of the input output device 46 also functions as a touch panel. Accordingly, a driver can send instructions to the collision avoidance ECU 20 by touching the display unit.

The speakers 47 are respectively disposed inside the left and right front doors (not shown) of the vehicle 10 (within the vehicle compartment). The speakers 47 can produce sounds such as a warning sound and a voice message in accordance with instructions from the collision avoidance ECU 20.

The engine ECU 31 is connected to a plurality of engine sensors 61 and receives detection signals from these sensors. The engine sensors 61 detect the operation state quantities of the engine 62 which is a drive source of the vehicle 10. The engine sensors 61 include an accelerator pedal operation amount sensor, a throttle valve opening sensor, an engine speed sensor, an intake air amount sensor, etc.

Further, the engine ECU 31 is connected to engine actuators 63, such as a throttle valve actuator and a fuel injection valve, and a transmission 64. The engine ECU 31 changes the drive torque Tq generated by the engine 62 of the vehicle 10 and the gear ratio of the transmission 64 by controlling the engine actuators 63 and the transmission 64. Thus, the engine ECU 31 adjusts the drive force of the vehicle 10, to thereby control the acceleration As. Further, the collision avoidance ECU 20 drives the engine actuators 63 and the transmission 64 by sending instructions to the engine ECU 31, to thereby change the driving force of the vehicle 10.

The brake ECU 32 is connected to a plurality of brake sensors 65 and receives detection signals from these sensors. The brake sensors 65 detect parameters used for controlling an unillustrated "brake (hydraulic frictional brake) mounted on the vehicle 10." The brake sensors 65 include an operation amount sensor for detecting the operation amount of a brake pedal (not shown), wheel speed sensors for detecting the rotational speeds of the wheels, etc.

Further, the brake ECU 32 is connected to a brake actuator 66. The brake actuator 66 is a hydraulic control actuator. The brake actuator 66 is provided in a hydraulic circuit extending between a master cylinder which pressurizes hydraulic oil by using the depressing force applied to the brake pedal and the friction brake including well-known wheel cylinders provided in the wheels. The hydraulic circuit, the master cylinder, and the friction brake are not shown in the drawings. The brake actuator 66 controls the oil pressure supplied to the wheel cylinders. The brake ECU 32 generates brake forces (frictional brake forces) Bf applied to the wheels, by driving the brake actuator 66, so as to control the acceleration As (in this case, negative acceleration; namely, deceleration) of the vehicle 10. Further, the collision avoidance ECU 20 drives the brake actuator 66 by sending an instruction to the brake ECU 32, to thereby change the brake forces Bf.

The EPS ECU 33 is connected to a torque sensor 67 and a steering angle sensor 68 and receives detection signals from these sensors. The torque sensor 67 and the steering angle sensor 68 are disposed on a steering shaft (not shown) connected to a steering wheel 51. The torque sensor 67 outputs a signal representing a steering torque Ts which is applied to the steering wheel 51 by the driver. The steering angle sensor 68 outputs a signal representing a steering angle θs which is the rotational angle of the steering shaft of the steering wheel 51. The steering angle θs becomes "0" when the steering wheel 51 is located at its neutral position, assumes a positive value when the steering wheel 51 is operated clockwise from the neutral position, and assumes a negative value when the steering wheel 51 is operated counterclockwise from the neutral position.

Further, the EPS ECU 33 is connected to a drive circuit 69. The drive circuit 69 supplies electric power to a motor 71. The motor 71 generates a motor torque Tm for rotating the steering shaft of the steering wheel 51. In order to assist the steering operation of the steering wheel 51 by the driver, the EPS ECU 33 controls the drive circuit 69 such that the motor torque Tm becomes equal to a "target assist torque Ta determined on the basis of the steering torque Ts, the steering angle θs, the vehicle speed Vs, etc." Further, the collision avoidance ECU 20 drives the motor 71 by sending an instruction to the EPS ECU 33, to thereby change the turning angles of the turnable wheels of the vehicle 10.

(Collision Avoidance Control—Outline)

Next, there will be described a collision avoidance control which is executed by the collision avoidance ECU 20 in order to avoid collision with an obstacle. The collision avoidance control includes an automatic braking process and an automatic steering process. The automatic braking process is a process which is executed when the vehicle 10 is highly likely to collide with the obstacle, so as to determine a target deceleration Dctgt which is a deceleration (i.e., negative acceleration) necessary to avoid the collision and render the actual acceleration As of the vehicle 10 coincident with the target deceleration Dctgt.

The automatic steering process is a process which is executed when the possibility that the collision with the obstacle cannot be avoided by the automatic braking process only is high, so as to determine a detouring travel path Rd for avoiding the collision and render the actual travel path of the vehicle 10 coincident with the detouring travel path Rd. The driver of the vehicle 10 can switch the state of request of the collision avoidance control, by operating the input output device 46, between an ON state for permitting the execution of the collision avoidance control and an OFF state for prohibiting the execution of the control. Since this collision avoidance control is a known control disclosed in, for example, Japanese Patent Application Laid-Open No. 2017-27292, the collision avoidance control will be briefly described below.

(Collision Avoidance Control—Automatic Braking Process)

First, the automatic braking process will be described. The collision avoidance ECU 20 obtains a lateral distance (distance in the lateral direction) Dy(n) of a target (n) present in a region in front of the vehicle 10, a longitudinal distance (inter-vehicle distance) Dx(n) of the target (n), a relative lateral speed Vy(n) of the target (n), a relative longitudinal speed Vx(n) of the target (n), and a lateral width Wd(n) of the target (n) on the basis of the target information received from the millimeter wave radar 41 and the frontward image received from the front camera 42. The relative lateral speed Vy(n) is the amount of change in the lateral distance Dy(n) per unit time, and the relative longitudinal speed Vx(n) is the amount of change in the longitudinal distance Dx(n) per unit time.

Figure 2:
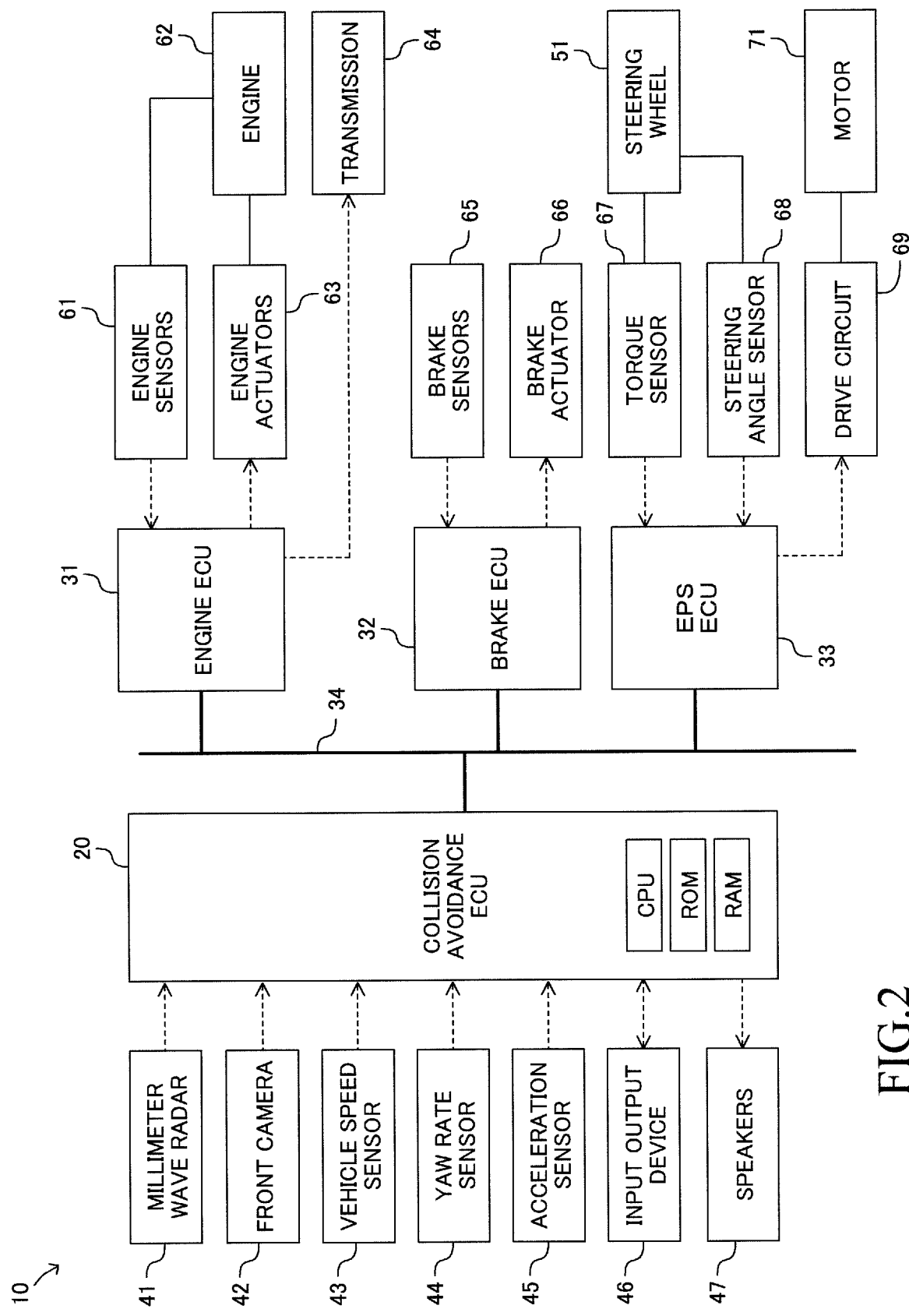
FIG. 2 is a block diagram of the present assisting apparatus.

Notably, as shown in FIG. 1, the longitudinal direction of the vehicle 10 is defined as an x axis, and the lateral direction of the vehicle 10 is defined as a y axis. The lateral center of a front end of the vehicle 10 is the origin where x=0 and y=0. The x coordinate assumes a positive value in the front direction of the vehicle 10 and assumes a negative value in the rear direction of the vehicle 10. The y coordinate assumes a positive value in the right direction of the vehicle 10 and assumes a negative value in the left direction of the vehicle 10. The symbol (n) is an identifier added to each target. In the present embodiment, "n" is a natural number.

On the basis of a moving locus of the target (n), the collision avoidance ECU 20 estimates an approach lateral distance Dyr(n), which is the lateral distance Dy(n) at the time when the longitudinal distance Dx(n) of the target (n) becomes zero, under the assumption that the vehicle speed Vs and the steering angle θs do not change and the moving speed, moving direction, etc. of the target (n) do not change. If the following equation (1) regarding the approach lateral distance Dyr(n) holds, the collision avoidance ECU 20 determines that the target (n) is an obstacle (a) which is highly likely to collide with the vehicle 10. The symbol (a) is the identifier of the target determined to be an obstacle (accordingly, "a") is a natural number). The target determined to be an obstacle is referred to as the "obstacle (a)" for convenience' sake.

$$|Dyr(n)| < Wo/2 + Wd(n)/2 + Lm \qquad (1)$$

Here, Wo is the width (length in the lateral direction) of the vehicle 10, and Lm is a predetermined length (collision determination margin).

In other words, the collision avoidance ECU 20 determines the target (n) to be the obstacle (a) in the case where, when the longitudinal distance Dx(n) of the target (n) becomes zero, the left end of the target (n) is located on the left side of a "position offset rightward from the right end of the vehicle 10 by the collision determination margin Lm" and the right end of the target (n) is located on the right side of a "position offset leftward from the left end of the vehicle 10 by the collision determination margin Lm."

Figure 3:
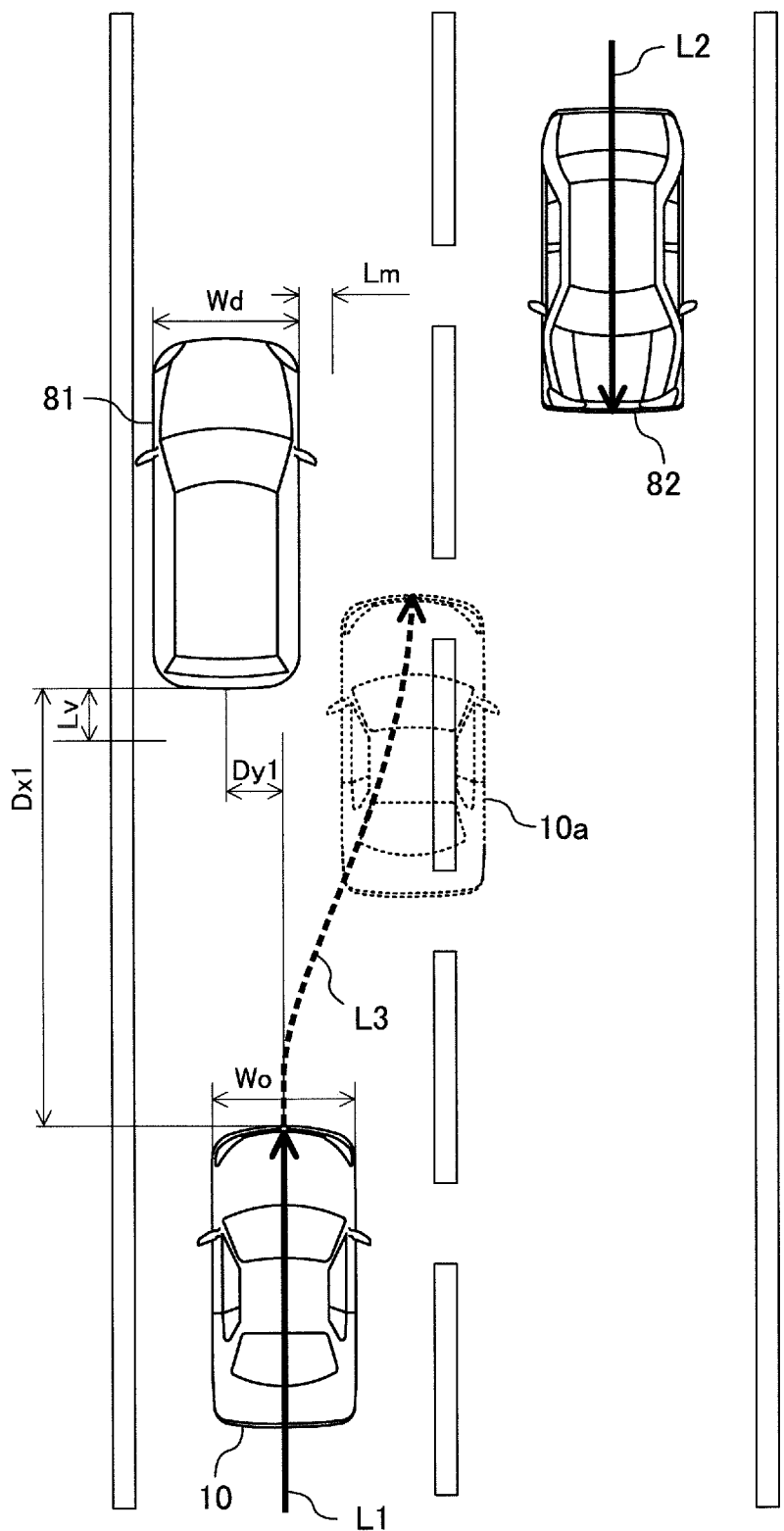
FIG. 3 is an illustration showing an example of collision avoidance control for an obstacle which is highly likely to collide with the present vehicle.

FIG. 3 is a plan view showing the case where a vehicle 81 is the obstacle (a) for the vehicle 10. The identifier of the vehicle 81 is set to (1) for convenience' sake. In the example of FIG. 3, the longitudinal distance Dx(1) between the vehicle 10 and the vehicle 81 is Dx1. In addition, the lateral distance Dy(1) between the vehicle 10 and the vehicle 81 is a negative value, and the magnitude of the lateral distance Dy(1) is Dy1. A continuous line arrow L1 represents the moving locus of the central portion of the front end of the vehicle 10.

A vehicle 82 shown in FIG. 3 is an oncoming vehicle for the vehicle 10 (a vehicle which travels in a lane opposite the lane in which the vehicle 10 is travelling). A continuous line arrow L2 represents a moving locus of the central portion of the front end of the vehicle 82.

In the example shown in FIG. 3, the vehicle 10 advances (travels straight), and the vehicle 81 is stopped. Therefore, the relative longitudinal speed Vx(1) is a negative value, the magnitude of the relative longitudinal speed Vx(1) is equal to the vehicle speed Vs, and the relative lateral speed Vy(1) is zero.

The length Dy1 is smaller than a half of the width of the vehicle 10 (namely, |Dy(1)|<Wo/2). In addition, since the vehicle 10 travels straight and the vehicle 81 is stopped, the approach lateral distance Dyr(1) is equal to Dy1 (namely, the magnitude of the lateral distance Dy(1) does not change from the length Dy1). Accordingly, the relation of equation (1) holds. Therefore, the collision avoidance ECU 20 determines that the vehicle 81 is an obstacle.

Once the obstacle is specified, the collision avoidance ECU 20 calculates a collision time TTC, which is a time expected to elapse until the vehicle 10 collides with the obstacle (a) on the basis of the longitudinal distance Dx(a) and the relative longitudinal speed Vx(a) of the obstacle (a). Specifically, the collision time TTC is obtained by reversing the sign of a value obtained by dividing the longitudinal distance Dx(a) by the relative longitudinal speed Vx(a) (namely, TTC=−Dx(a)/Vx(a)).

In the example shown in FIG. 3, the collision time TTC is equal to a value obtained by dividing the length Dx1 by the vehicle speed Vs (namely, TTC=Dx1/Vs).

If the collision time TTC is less than a predetermined time threshold Tth (specifically, the collision time TTC is a positive value and the absolute value of the collision time TTC is less than the time threshold Tth), the collision avoidance ECU 20 starts the automatic braking process. The time threshold Tth is set to a time determined such that in the case where the collision time TTC is less than the time threshold Tth, even when the driver having become aware of the obstacle performs an ordinary braking operation, the driver cannot stop the vehicle 10 at a position before the obstacle.

At the time of execution of the automatic braking process, the collision avoidance ECU 20 determines a target deceleration Dctgt. More specifically, a required deceleration Dcreq, which is an acceleration As necessary for stopping the vehicle 10 after traveling over a travel distance Dd, is calculated in accordance with the following equation (2).

$$Dcreq = -(\tfrac{1}{2}) \cdot Vs^2 / Dd \quad (2)$$

The collision avoidance ECU 20 computes the required deceleration Dcreq by substituting the difference between the longitudinal distance Dx(a) of the obstacle (a) and a predetermined length (stop position margin) Lv into equation (2) as a travel distance Dd (namely, Dd=Dx(a)−Lv).

In the case where the magnitude |Dcreq| of the required deceleration Dcreq is greater than the magnitude |Dcmax| of a maximum deceleration Dcmax which is the maximum value of deceleration of the vehicle 10, the collision avoidance ECU 20 sets the value of the target deceleration Dctgt to the maximum deceleration Dcmax. Meanwhile, in the case where the magnitude |Dcreq| of the required deceleration Dcreq is equal to or less than the magnitude |Dcmax| of the maximum deceleration Dcmax, the collision avoidance ECU 20 sets the value of the target deceleration Dctgt to the required deceleration Dcreq. The maximum deceleration Dcmax is set such that slippage does not occur between the wheels (not shown) of the vehicle 10 and a road surface as a result of generation of the braking forces Bf for decreasing the vehicle speed Vs.

The collision avoidance ECU 20 sends request signals to the engine ECU 31 and the brake ECU 32 such that the actual acceleration As becomes equal to the target deceleration Dctgt. Specifically, the collision avoidance ECU 20 sends a request signal to the brake ECU 32 so as to request it to generate the braking force Bf such that the actual acceleration As becomes equal to the target deceleration Dctgt. In addition, the collision avoidance ECU 20 sends a request signal to the engine ECU 31 so as to request it to decrease the drive torque Tq to zero. As a result, the vehicle speed Vs decreases, and finally becomes zero.

(Collision Avoidance Control—Automatic Steering Process)

Next, the automatic steering process will be described. In the case where the magnitude |Dcreq| of the required deceleration Dcreq is greater than the magnitude |Dcmax| of the maximum deceleration Dcmax which is the maximum value of deceleration of the vehicle 10, the possibility that the collision with the obstacle (a) cannot be avoided by the automatic braking process only is high. In such a case, the collision avoidance ECU 20 attempts to obtain a detouring travel path Rd which is a path of the vehicle 10 that allows the vehicle 10 to avoid the collision with the obstacle (a) and does not cause collision with another target (n).

The detouring travel path Rd is a path which satisfies the following conditions (A) and (B).

(A) When the vehicle 10 travels along the detouring travel path Rd, the vehicle 10 does not collide with targets including the obstacle (a).

(B) The maximum value of the magnitude |θs| of the steering angle θs at the time when the vehicle 10 travels along the detouring travel path Rd is smaller than a predetermined maximum steering angle θmax. In the present embodiment, the maximum steering angle θmax is 130°.

In the example of FIG. 3, the detouring travel path Rd is represented by a dashed line arrow L3. When the vehicle 10 travels along the detouring travel path Rd, the vehicle 10 can avoid the collision with the vehicle 81 and does not collide with the vehicle 82. In addition, the maximum value of the magnitude of the steering angle θs at the time when the vehicle 10 travels along the detouring travel path Rd is smaller than the maximum steering angle θmax.

In the case where the collision avoidance ECU 20 has succeeded in obtaining the detouring travel path Rd, the collision avoidance ECU 20 adjusts the steering angle θs by means of the motor torque Tm generated by the motor 71 such that the vehicle 10 travels along the detouring travel path Rd. Namely, the collision avoidance ECU 20 executes the automatic steering process while executing the automatic braking process. A vehicle 10a represented by broken lines in FIG. 3 shows the position of the vehicle 10 after being stopped while being prevented from colliding with the vehicle 81 by the automatic braking process and the automatic steering process.

More specifically, the collision avoidance ECU 20 calculates an angle difference θy between the heading direction of the vehicle 10 and the extending direction of the detouring travel path Rd at the present position of the vehicle 10 on the detouring travel path Rd. In addition, the collision avoidance ECU 20 calculates a center distance Dh which is the distance (in the lateral direction) between the detouring travel path Rd and the center position of the front end of the vehicle 10 (the travel position difference). Further, the collision avoidance ECU 20 calculates a path curvature ν which the reciprocal of the radius of curvature of the detouring travel path Rd at the present position of the vehicle 10 on the detouring travel path Rd.

Next, on the basis of the center distance Dh, the angle difference θy, and the path curvature ν, the collision avoidance ECU 20 calculates a target yaw rate YRtgt in accordance with the following equation (3) at predetermined computation intervals. The target yaw rate YRtgt is a yaw rate set such that the vehicle 10 travels along the detouring travel path Rd.

$$YRtgt = K1 \cdot Dh + K2 \cdot \theta y + K3 \cdot \nu \quad (3)$$

Here, K1, K2, and K3 are predetermined control gains.

On the basis of the target yaw rate YRtgt and the actual yaw rate YR, the collision avoidance ECU 20 determines a target motor torque Tmtgt of the motor 71 required for realization of the target yaw rate YRtgt at predetermined computation intervals. More specifically, the collision avoidance ECU 20 calculates a yaw rate difference ΔYR which is the difference between the target yaw rate YRtgt and the actual yaw rate YR (namely, ΔYR=YRtgt−YR). In addition, the collision avoidance ECU 20 determines the target motor torque Tmtgt by applying the yaw rate difference ΔYR to a "lookup table defining the relation between the yaw rate difference ΔYR and the target motor torque Tmtgt," which is stored in advance.

Further, the collision avoidance ECU 20 sends a request signal to the EPS ECU 33 such that the actual motor torque Tm becomes equal to the target motor torque Tmtgt. As described above, when the vehicle 10 travels along the detouring travel path Rd, the maximum value of the magnitude |θs| of the steering angle θs does not exceed the maximum steering angle θmax.

(Collision Avoidance Control Stopping Process)

Incidentally, in some cases, the driver of the vehicle 10 attempts to avoid the collision with the obstacle by operating the steering wheel 51 in a period between a point in time when the collision avoidance control has been started and a point in time when the vehicle 10 stops. In such a case, the collision avoidance control must be stopped in order to place priority on the collision avoidance operation of the vehicle 10 by the driver. In view of this, when the magnitude |θs| of the steering angle θs becomes greater than the predetermined threshold during execution of the collision avoidance control, the collision avoidance ECU 20 determines that the driver of the vehicle 10 is trying to avoid the collision with the obstacle by operating the steering wheel 51, and stops the execution of the collision avoidance control.

More specifically, in the case where, of the automatic braking process and the automatic steering process, only the automatic braking process is being executed, if the magnitude |θs| of the steering angle θs is greater than a first angle threshold θth1 (namely, |θs|>θth1), the collision avoidance ECU 20 stops the execution of the collision avoidance control. Namely, the collision avoidance ECU 20 stops the execution of the automatic braking process. In the present embodiment, the first angle threshold θth1 is 50°. However, no limitation is imposed on the first angle threshold θth1 so long as it is set to a value smaller than the "maximum steering angle θmax which is the maximum value of the magnitude |θs| of the steering angle θs changed in the automatic steering process."

Meanwhile, in the case where both the automatic braking process and the automatic steering process are being executed, the magnitude |θs| of the steering angle θs may increase to the maximum steering angle θmax (130° in the present embodiment) as a result of the automatic steering operation. Therefore, even when the magnitude |θs| of the steering angle θs becomes greater than the "first angle threshold θth1 smaller than the maximum steering angle θmax," the collision avoidance ECU 20 cannot determine whether the present state is a state in which the driver is operating the steering wheel 51 or a state in which the magnitude |θs| of the steering angle θs is greater than the first angle threshold θth1 due to the automatic steering process.

In view of the above, in the case where the magnitude |θsi of the steering angle θs is greater than a "second angle threshold θth2 greater than the maximum steering angle θmax" (namely, |θs|>θth2>θmax>θth1), the collision avoidance ECU 20 determines that the driver is trying to avoid the collision with the obstacle by operating the steering wheel 51 and stops the execution of the collision avoidance control. Namely, in the case where the magnitude |θs| of the steering angle θs is greater than the second angle threshold θth2, the collision avoidance ECU 20 stops the execution of the automatic braking process and the execution of the automatic steering process. In the present embodiment, the second angle threshold θth2 is 150°.

(Specific Operation)

Next, specific operation of the collision avoidance ECU 20 will be described. The CPU of the collision avoidance ECU 20 (hereinafter also referred to as the "CPU" for simplification) executes a "collision avoidance control start process routine," an "automatic braking process routine," and an "automatic steering process routine" every time a predetermined time elapses.

Figure 4:
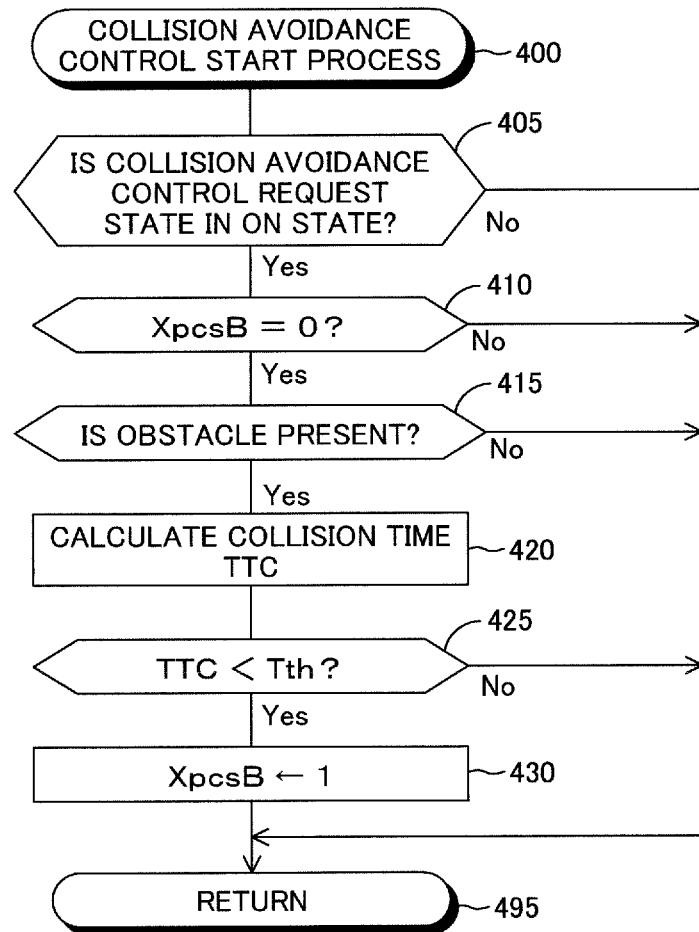
FIG. 4 is a flowchart representing a collision avoidance control start process routine executed by the present assisting apparatus.

First, the collision avoidance control start process routine will be described. The collision avoidance control start process routine is represented by a flowchart in FIG. 4. When a proper timing has come, the CPU starts the process from step 400 of FIG. 4, and proceeds to step 405 so as to determine whether or not the state of request of the collision avoidance control is the ON state.

In the case where the state of request of the collision avoidance control is set to the OFF state through the operation of the input output device 46 by the driver, the CPU makes a "No" determination in step 405 and proceeds to step 495 so as to end the present routine.

Meanwhile, in the case where the state of request of the collision avoidance control is set to the ON state, the CPU makes a "Yes" determination in step 405 and proceeds to step 410 so as to determine whether or not the value of an automatic braking process execution flag XpcsB is "0."

Figure 5:
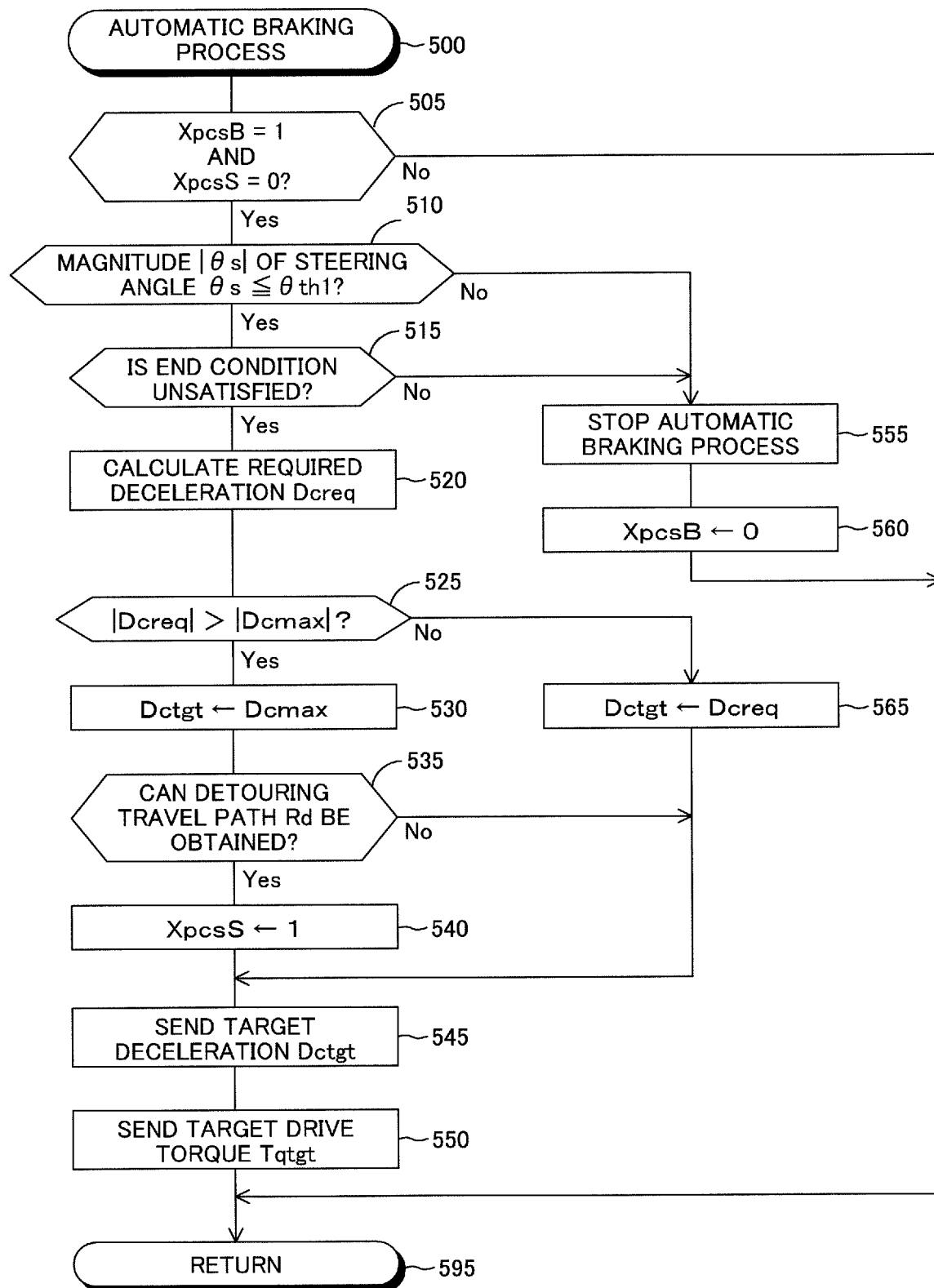
FIG. 5 is a flowchart representing an automatic braking process routine executed by the present assisting apparatus.
Figure 6:
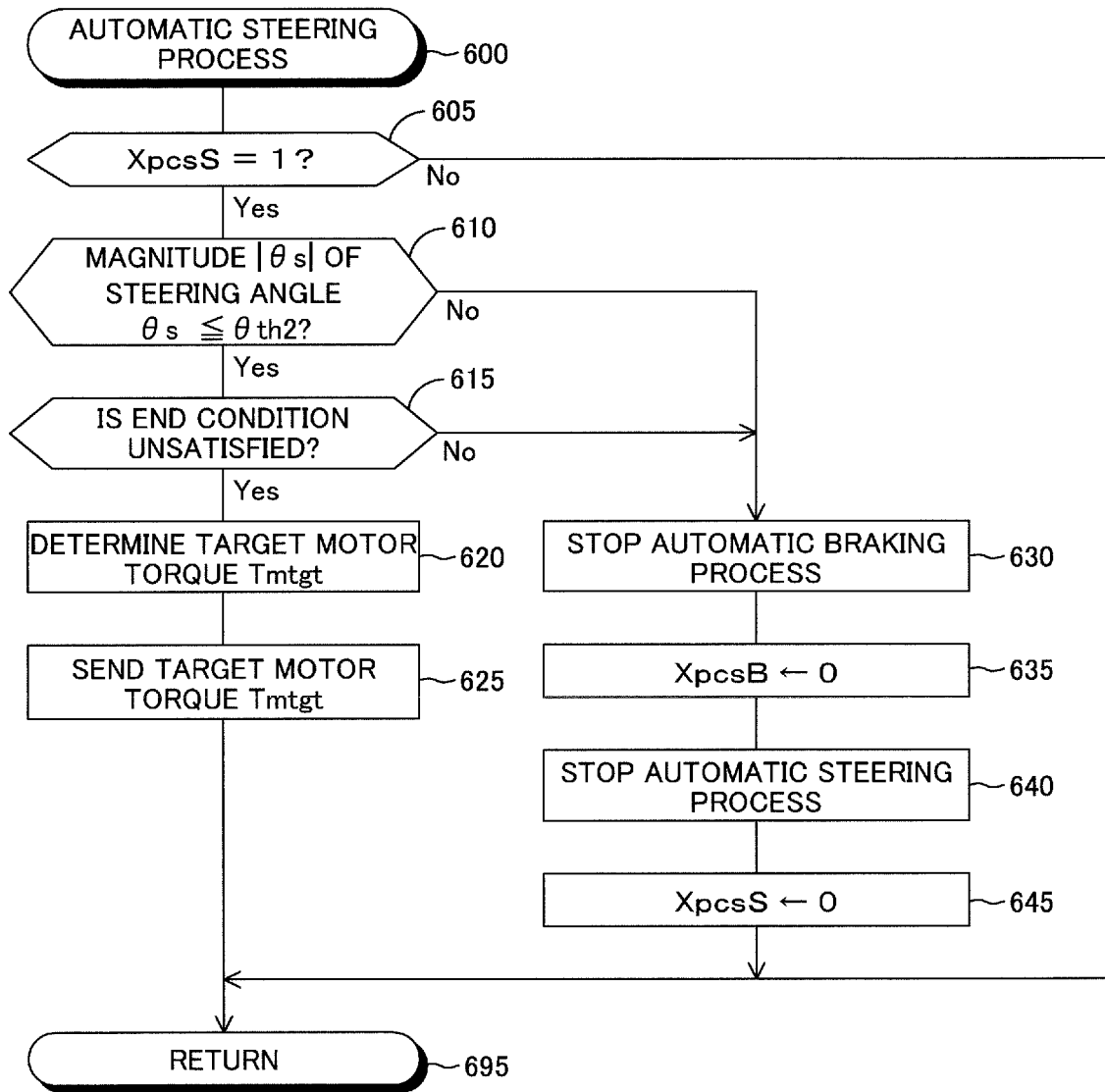
FIG. 6 is a flowchart representing an automatic steering process routine executed by the present assisting apparatus.

The automatic braking process execution flag XpcsB is set to "1" when the automatic braking process is executed (see step 430, step 560 of FIG. 5, and step 635 of FIG. 6 which will be described later). The automatic braking process execution flag XpcsB is set to "0" in an initial routine (not shown) which is executed by the CPU when the collision avoidance ECU 20 is started (namely, an unillustrated ignition key switch of the vehicle 10 is moved to its OFF position to its ON position).

In the case where the value of the automatic braking process execution flag XpcsB is "0," the CPU makes a "Yes" determination in step 410 and proceeds to step 415 so as to determine whether or not a target determined to be an obstacle is present.

In the case where a target determined to be an obstacle is present, the CPU makes a "Yes" determination in step 415 and proceeds to step 420 so as to calculate the collision time TTC. Subsequently, the CPU proceeds to step 425 so as to determine whether or not the collision time TTC is less than the time threshold Tth.

In the case where the collision time TTC is less than the time threshold Tth, the CPU makes a "Yes" determination in step 425 and proceeds to step 430 so as to set the value of the automatic braking process execution flag XpcsB to "1." Subsequently, the CPU proceeds to step 495.

In the case where the determination condition of step 410 is not satisfied (namely, the value of the automatic braking process execution flag XpcsB is "1"), the CPU makes a "No" determination in step 410 and proceeds directly to step 495. In addition, in the case where the determination condition of step 415 is not satisfied (namely, a target determined to be an obstacle is not present), the CPU makes a "No" determination in step 415 and proceeds directly to step 495. Moreover, in the case where the determination condition of step 425 is not satisfied (namely, the collision time TTC is equal to or greater than the time threshold Tth), the CPU makes a "No" determination in step 425 and proceeds directly to step 495.

Next, the automatic braking process routine will be described. The automatic braking process routine is represented by a flowchart in FIG. 5. When a proper timing has come, the CPU starts the process from step 500 of FIG. 5, and proceeds to step 505 so as to determine whether or not the condition that the value of the automatic braking process execution flag XpcsB is "1" and the value of an automatic steering process execution flag XpcsS is "0" is satisfied.

The automatic steering process execution flag XpcsS is set to "1" when the automatic steering process is executed (see step 540 of FIG. 5 and step 645 of FIG. 6 which will be described later). The automatic steering process execution flag XpcsS is set to "0" in the above-mentioned initial routine.

In the case where the condition that the value of the automatic braking process execution flag XpcsB is "1" and the value of the automatic steering process execution flag XpcsS is "0" is not satisfied (namely, in the case where the value of the automatic braking process execution flag XpcsB is "0" or the value of the automatic steering process execution flag XpcsS is "1"), the CPU makes a "No" determination in step 505 and proceeds directly to step 595 so as to end the present routine.

Meanwhile, in the case where the condition that the value of the automatic braking process execution flag XpcsB is "1" and the value of the automatic steering process execution flag XpcsS is "0" is satisfied, the CPU makes a "Yes" determination in step 505 and proceeds step 510 so as to determine whether or not the magnitude |θs| of the steering angle θs is equal to or less than the first angle threshold θth1.

In the case where the magnitude |θs| of the steering angle θs is equal to or less than the first angle threshold θth1, the CPU makes a "Yes" determination in step 510 and proceeds step 515 so as to determine whether or not an end condition for ending the collision avoidance control is unsatisfied. The end condition is a condition which is satisfied when the vehicle speed Vs is zero.

In the case where the end condition for ending the collision avoidance control is unsatisfied, the CPU makes a "Yes" determination in step 515 and proceeds step 520 so as to calculate the required deceleration Dcreq. Subsequently, the CPU proceeds to step 525 so as to determine whether or not the magnitude Dcreq of the required deceleration Dcreq is greater than the magnitude |Dcmax| of the maximum deceleration Dcmax.

In the case where the magnitude |Dcreq| of the required deceleration Dcreq is equal to or less than the magnitude |Dcmax| of the maximum deceleration Dcmax, the CPU makes a "No" determination in step 525 and proceeds step 565 so as to set the value of the target deceleration Dctgt to the required deceleration Dcreq.

Next, the CPU proceeds to step 545 and sends the target deceleration Dctgt to the brake ECU 32 through the CAN 34. As a result, the brake ECU 32 controls the brake actuator 66 by executing an unillustrated routine such that the actual acceleration As becomes equal to the target deceleration Dctgt, whereby the required braking force Bf is generated.

Subsequently, the CPU proceeds to step 550. In step 550, the CPU sets the value of a target drive torque Tqtgt to "0" and sends the target drive torque Tqtgt to the engine ECU 31 through the CAN 34. As a result, the engine ECU 31 controls the engine actuators 63 and the transmission 64 by executing an unillustrated routine such that the actual drive torque Tq becomes equal to the target drive torque Tqtgt. After that, the CPU proceeds to step 595.

Meanwhile, in the case where the determination condition of step 525 is satisfied (namely, the magnitude |Dcreq| of the required deceleration Dcreq is greater than the magnitude |Dcmax| of the maximum deceleration Dcmax), the CPU makes a "Yes" determination in step 525 and proceeds step 530 so as to set the value of the target deceleration Dctgt to the maximum deceleration Dcmax.

Subsequently, the CPU proceeds to step 535 and tries to obtain the detouring travel path Rd to thereby determine whether or not the detouring travel path Rd is present. In the case where the detouring travel path Rd is present, the CPU makes a "Yes" determination in step 535 and proceeds to step 540 so as to set the value of the automatic steering process execution flag XpcsS to "1." As a result, the automatic steering process is executed by the automatic steering process routine of FIG. 6 which will be described later. Subsequently, the CPU proceeds to step 545.

Meanwhile, in the case where the determination condition of step 510 is not satisfied (namely, the steering angle θs is greater than the first angle threshold θth1), the CPU makes a "No" determination in step 510 and proceeds to step 555 so as to stop the automatic braking process. Namely, the CPU determines that the driver is operating the steering wheel 51 of the vehicle 10 and stops the automatic braking process.

More specifically, the CPU sets the value of the target deceleration Dctgt to "0" and sends the target deceleration Dctgt to the brake ECU 32. Notably, if the vehicle speed Vs at the time of execution of the process of step 555 is zero, the CPU sets, as a value of the target braking force Bftgt, a braking force Bf necessary to maintain the vehicle 10 in a stopped state and sends the target braking force Bftgt to the brake ECU 32. In this case, the brake ECU 32 renders the actual braking force Bf coincident with the target braking force Bftgt by controlling the brake actuator 66. Next, the CPU proceeds to step 560 and sets the value of the automatic braking process execution flag XpcsB to "0." Further, the CPU proceeds to step 595.

Notably, in the case where the determination condition of step 515 is not satisfied (namely, the end condition for ending the collision avoidance control is satisfied), the CPU makes a "No" determination in step 515 and proceeds to step 555. In addition, in the case where the determination condition of step 535 is not satisfied (namely, the detouring travel path Rd is not present), the CPU makes a "No" determination in step 535 and proceeds directly to step 545. In this case, since the value of the automatic steering process execution flag XpcsS is maintained at "0," the automatic steering process is not executed.

Next, the automatic steering process routine will be described. The automatic steering process routine is represented by a flowchart in FIG. 6. When a proper timing has come, the CPU starts the process from step 600 of FIG. 6, and proceeds to step 605 so as to determine whether or not the value of the automatic steering process execution flag XpcsS is "1."

In the case where the value of the automatic steering process execution flag XpcsS is not "1" (namely, the value of the automatic steering process execution flag XpcsS is "0"), the CPU makes a "No" determination in step 605 and proceeds directly to step 695 so as to end the present routine.

Meanwhile, in the case where the value of the automatic steering process execution flag XpcsS is "1," the CPU makes a "Yes" determination in step 605 and proceeds to step 610 so as to determine whether or not the magnitude |74 s| of the steering angle θs is equal to or less than the second angle threshold θth2.

In the case where the magnitude |θs| of the steering angle θs is equal to or less than the second angle threshold θth2, the CPU makes a "Yes" determination in step 610 and proceeds step 615 so as to determine whether or not the above-described end condition for ending the collision avoidance control is unsatisfied. In the case where the end condition for ending the collision avoidance control is unsatisfied, the CPU makes a "Yes" determination in step 615 and proceeds to step 620 so as to determine the target motor torque Tmtgt such that the vehicle 10 travels along the detouring travel path Rd.

Subsequently, the CPU proceeds to step 625 and sends the target motor torque Tmtgt to the EPS ECU 33 through the CAN 34. As a result, the EPS ECU 33 controls the drive circuit 69 by executing an unillustrated routine such that the motor torque Tm actually generated by the motor 71 becomes equal to the target motor torque Tmtgt. As a result, the vehicle 10 travels along the detouring travel path Rd. Subsequently, the CPU proceeds to step 695.

Meanwhile, in the case where the determination condition of step 610 is not satisfied (namely, the magnitude |θs| of the steering angle θs is greater than the second angle threshold θth2), the CPU makes a "No" determination in step 610, successively executes the processes of steps 630 through 645, and then proceeds to step 695. In this case, the CPU determines that the driver is operating the steering wheel 51 of the vehicle 10.

Step 630: The CPU stops the automatic braking process by executing a process similar to that of step 555.

Step 635: The CPU sets the value of the automatic braking process execution flag XpcsB to "0."

Step 640: The CPU stops the automatic steering process. More specifically, the CPU sets the value of the target motor torque Tmtgt to "0" and sends the target motor torque Tmtgt to the EPS ECU 33. Notably, in this case, the EPS ECU 33 controls the drive circuit 69 such that the motor 71 generates a "torque which is equal to a target assist torque Ta for assisting the steering operation of the steering wheel 51 by the driver."

Step 645: The CPU sets the value of the automatic steering process execution flag XpcsS to "0."

Notably, in the case where the determination condition of step 615 is not satisfied (namely, the end condition for ending the collision avoidance control is satisfied), the CPU makes a "No" determination in step 615, successively executes the processes of steps 630 through 645, and then proceeds to step 695.

As described above, in the case where only the automatic braking process is being executed as the collision avoidance control, the collision avoidance ECU 20 stops the execution of the collision avoidance control (namely, the automatic braking process) if the magnitude |θs| of the steering angle θs is greater than the first angle threshold θth1. Meanwhile, in the case where both the automatic braking process and the automatic steering process are being executed as the collision avoidance control, the collision avoidance ECU 20 stops the execution of the collision avoidance control (namely, both the automatic braking process and the automatic steering process) if the magnitude psi of the steering angle θs is greater than the second angle threshold θth2. Accordingly, the present assisting apparatus can determine more properly whether to stop the automatic braking process and the automatic steering process in the case where the driver is trying to avoid collision with an obstacle by his/her steering operation.

The embodiment of the collision avoidance assisting apparatus according to the present invention has been described; however, the present invention is not limited to the above-described embodiment, and various modifications are possible without departing from the scope of the invention. For example, the vehicle 10 according to the present embodiment has the millimeter wave radar 41 and the front camera 42 for obtaining the target information. However, one of the millimeter wave radar 41 and the front camera 42 may be omitted. Further, instead of or in addition to the millimeter wave radar 41 and the front camera 42, the vehicle 10 may has an ultrasonic wave sonar and/or a laser radar.

In addition, the time threshold Tth in the present embodiment is a fixed value. However, the time threshold Tth may vary with the positional relation between the vehicle 10 and an obstacle. For example, the time threshold Tth may be set such that its value increases with a lap ratio which is calculated as the ratio of a "length (in the lateral direction of the vehicle 10) of a portion of the vehicle 10 which comes into contact with an obstacle when the vehicle 10 collides with the obstacle" to the width Wo of the vehicle 10.

Alternatively, in the case where the obstacle is a continuous structure, such as a side wall, guard rail, or the like of a road, and the obstacle is inclined relative to the lateral direction of the vehicle 10, the time threshold Tth may be set such that its value increases with the angle (acute angle) between the heading direction of the vehicle 10 and the "intersection between a road surface and a surface of the obstacle facing the vehicle 10" (namely, the amount of operation of the steering wheel 51 required to avoid collision with the obstacle).

In addition, the maximum deceleration Dcmax in the present embodiment is a fixed value. However, the maximum deceleration Dcmax may vary with conditions. For example, in the case where slippage occurs between the wheels of the vehicle 10 and a road surface when the value of the target deceleration Dctgt increases gradually, the collision avoidance ECU 20 may employ, as the maximum deceleration Dcmax, a value slightly greater than the acceleration As at that time (the acceleration As has a negative value in this case); i.e., a negative value whose absolute value is smaller than that of the acceleration As at that time.

Alternatively, when the slippage having occurred between the wheels of the vehicle 10 and the road surface ends as a result of a gradual decrease in the value of the target deceleration Dctgt, the collision avoidance ECU 20 may employ, as the maximum deceleration Dcmax, a value slightly greater than the acceleration As at that time; i.e., a negative value whose absolute value is smaller than that of the acceleration As at that time. In other words, the vehicle 10 may include an antilock brake mechanism. In such a case, the target deceleration of the vehicle 10 determined when the antilock brake mechanism operates is employed as the maximum deceleration Dcmax.

In addition, the end condition for ending the collision avoidance control in the present embodiment is a condition which is satisfied when the vehicle speed Vs is "0." However, the end condition may be a condition different from that condition. For example, the end condition may be a condition which is satisfied when the vehicle speed Vs is "0" and additionally when the collision time TTC becomes greater than the time threshold Tth because of movement of a target determined to be an obstacle. In other words, in this case, the end condition is satisfied when the vehicle speed Vs is "0" or when the collision time TTC becomes greater than the time threshold Tth because of movement of a target determined to be an obstacle.

In addition, when the collision avoidance ECU 20 according to the present embodiment executes the automatic steering process, the collision avoidance ECU 20 sets the value of the target deceleration Dctgt to the maximum deceleration Dcmax. However, when the collision avoidance ECU 20 executes the automatic steering process, the collision avoidance ECU 20 may set the value of the target deceleration Dctgt to a value greater than the maximum deceleration Dcmax; i.e., a negative value whose absolute value is smaller than that of the maximum deceleration Dcmax. For example, in the case where it is determined that the distance of travel of the vehicle 10 before stoppage is desirably increased in order to avoid collision with a target other than the target determined to be an obstacle, the collision avoidance ECU 20 may set the magnitude |Dctgt| of the target deceleration Dctgt to a value smaller than the magnitude |Dcmax| of the maximum deceleration Dcmax when it executes the automatic steering process.

The second angle threshold θth2 in the present embodiment is set to a value greater than the maximum steering angle θmax. However, the second angle threshold θth2 may be set to a value equal to or less than the maximum steering angle θmax so long as the value is greater than the first angle threshold θth1.

The motor 71 in the present embodiment generates a motor torque for rotating the steering shaft of the steering wheel 51. However, the motor 71 may generate a torque for reciprocating a "rack bar which has a rack gear in meshing engagement with a pinion gear connected to the steering shaft for integral rotation therewith and which changes the turning angles of the turnable wheels of the vehicle 10."

What is claimed is:

1. A collision avoidance assisting apparatus comprising:
   a central processing unit (CPU); and
   a memory coupled to the CPU and configured to store a program that, when executed by the CPU, causes the collision avoidance assisting apparatus to:
   detect an obstacle in a heading direction of a vehicle;
   detect a steering angle of a steering wheel of said vehicle;
   when the obstacle is detected, execute an automatic braking process of decreasing speed of said vehicle by controlling a braking apparatus of said vehicle; and
   subsequently when said vehicle is determined not to be able to be stopped only by said automatic braking process at a point in time before said vehicle reaches said detected obstacle, execute an automatic steering process in addition to said automatic braking process, said automatic steering process changing turning angles of turnable wheels of said vehicle by controlling a steering apparatus of said vehicle including said steering wheel,
   wherein the program that, when executed by the CPU, further causes the collision avoidance assisting apparatus to execute an execution state determination process of determining an execution state of said automatic steering process for determining whether said automatic braking process is to be stopped or to be continued when said automatic braking process is executed, and wherein,
   in a case where said automatic braking process is executed and said automatic steering process is not being executed, said execution state determination process is a process of stopping the execution of said automatic braking process when magnitude of said detected steering angle becomes greater than a predetermined first angle threshold; and
   in a case where said automatic steering process is being executed, said execution state determination process is a process of continuing to execute both said automatic braking process and said automatic steering process even when the magnitude of said detected steering angle becomes greater than said predetermined first angle threshold.

2. A collision avoidance assisting apparatus according to claim 1, wherein the program that, when executed by the CPU, further causes the collision avoidance assisting apparatus to: when both said automatic braking process and said automatic steering process are being executed, stop the execution of said automatic braking process and the execution of said automatic steering process when the magnitude of said detected steering angle becomes greater than a predetermined second angle threshold, the predetermined second angle threshold being greater than said predetermined first angle threshold.

3. A collision avoidance assisting apparatus according to claim 2, wherein the program that, when executed by the CPU, further causes the collision avoidance assisting apparatus to: control said steering apparatus such that the magnitude of said detected steering angle does not become greater than a predetermined steering angle wherein said predetermined first angle threshold is less than the predetermined steering angle and said predetermined second angle threshold is greater than the predetermined steering angle.

4. A collision avoidance assisting apparatus according to claim 3, wherein the program that, when executed by the CPU, further causes the collision avoidance assisting apparatus to:
   calculate a collision time, the collision time being a time expected to elapse until said vehicle collides with said detected obstacle; and
   determine that said vehicle is to collide with said detected obstacle when said calculated collision time is shorter than a predetermined time threshold.

5. A collision avoidance assisting apparatus according to claim 4, wherein the program that, when executed by the CPU, further causes the collision avoidance assisting apparatus to:
   when said calculated collision time is shorter than said time threshold, determine a required deceleration necessary for avoiding collision with said detected obstacle;
   when magnitude of said required deceleration is equal to or less than magnitude of a maximum deceleration, use said required deceleration as a target deceleration, and when the magnitude of said required deceleration is greater than the magnitude of said maximum deceleration, use said maximum deceleration as said target deceleration;
   execute said automatic braking process such that an actual deceleration of said vehicle becomes equal to said target deceleration; and
   when the magnitude of said required deceleration is greater than the magnitude of said maximum deceleration, determine that said vehicle is unable to be stopped only by said automatic braking process at the point in time before said vehicle reaches said detected obstacle.

6. A collision avoidance assisting apparatus according to claim 3, wherein the program that, when executed by the CPU, further causes the collision avoidance assisting apparatus to: when said automatic steering process is being executed, control said steering apparatus to cause said vehicle to travel along a detouring travel path which is a travel path of said vehicle.

7. A collision avoidance assisting apparatus according to claim 2, wherein the program that, when executed by the CPU, further causes the collision avoidance assisting apparatus to:

calculate a collision time, the collision time being a time expected to elapse until said vehicle collides with said detected obstacle; and determine that said vehicle is to collide with said detected obstacle when said calculated collision time is shorter than a predetermined time threshold.

8. A collision avoidance assisting apparatus according to claim 7, wherein the program that, when executed by the CPU, further causes the collision avoidance assisting apparatus to:

when said calculated collision time is shorter than said time threshold, determine a required deceleration necessary for avoiding collision with said detected obstacle;

when magnitude of said required deceleration is equal to or less than magnitude of a maximum deceleration, use said required deceleration as a target deceleration, and when the magnitude of said required deceleration is greater than the magnitude of said maximum deceleration, use said maximum deceleration as said target deceleration;

execute said automatic braking process such that an actual deceleration of said vehicle becomes equal to said target deceleration; and when the magnitude of said required deceleration is greater than the magnitude of said maximum deceleration, determine that said vehicle is unable to be stopped only by said automatic braking process at the point in time before said vehicle reaches said detected obstacle.

9. A collision avoidance assisting apparatus according to claim 2, wherein the program that, when executed by the CPU, further causes the collision avoidance assisting apparatus to: when said automatic steering process is being executed, control said steering apparatus to cause said vehicle to travel along a detouring travel path which is a travel path of said vehicle.

10. A collision avoidance assisting apparatus according to claim 1, wherein the program that, when executed by the CPU, further causes the collision avoidance assisting apparatus to:

calculate a collision time, said collision time being a time expected to elapse until said vehicle collides with said detected obstacle; and determine that said vehicle is to collide with said detected obstacle when said calculated collision time is shorter than a predetermined time threshold.

11. A collision avoidance assisting apparatus according to claim 10, wherein the program that, when executed by the CPU, further causes the collision avoidance assisting apparatus to:

when said calculated collision time is shorter than said time threshold, determine a required deceleration necessary for avoiding collision with said detected obstacle;

when magnitude of said required deceleration is equal to or less than magnitude of a maximum deceleration, use said required deceleration as a target deceleration, and when the magnitude of said required deceleration is greater than the magnitude of said maximum deceleration, use said maximum deceleration as said target deceleration;

execute said automatic braking process such that an actual deceleration of said vehicle becomes equal to said target deceleration; and when the magnitude of said required deceleration is greater than the magnitude of said maximum deceleration, determine that said vehicle is unable to be stopped only by said automatic braking process at the point in time before said vehicle reaches said detected obstacle.

12. A collision avoidance assisting apparatus according to claim 1, wherein the program that, when executed by the CPU, further causes the collision avoidance assisting apparatus to: when said automatic steering process is being executed, control said steering apparatus to cause said vehicle to travel along a detouring travel path which is a travel path of said vehicle.

* * * * *